(12) United States Patent
Fujita

(10) Patent No.: US 10,450,728 B2
(45) Date of Patent: Oct. 22, 2019

(54) PROJECTION TYPE DISPLAY DEVICE AND PROJECTION CONTROL METHOD

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

(21) Appl. No.: 15/885,823

(22) Filed: Feb. 1, 2018

(65) Prior Publication Data

US 2018/0155902 A1 Jun. 7, 2018

Related U.S. Application Data

(63) Continuation of application No. PCT/JP2016/057053, filed on Mar. 8, 2016.

(30) Foreign Application Priority Data

Sep. 10, 2015 (JP) .................................. 2015-178658

(51) Int. Cl.
*E02F 9/26* (2006.01)
*B60K 35/00* (2006.01)
(Continued)

(52) U.S. Cl.
CPC ................ *E02F 9/26* (2013.01); *B60K 35/00* (2013.01); *B60K 37/02* (2013.01);
(Continued)

(58) Field of Classification Search
CPC ............ B60K 35/00; B60K 2350/2052; B60K 2350/1072; B60K 37/02; B60K 2350/965;
(Continued)

(56) References Cited

U.S. PATENT DOCUMENTS

2011/0199198 A1* 8/2011 Yang .................... B60K 35/00
340/426.25
2016/0103319 A1* 4/2016 Remillard .............. G02B 27/01
345/1.3
(Continued)

FOREIGN PATENT DOCUMENTS

JP H01312129 12/1989
JP H05104981 4/1993
(Continued)

OTHER PUBLICATIONS

"International Search Report (Form PCT/ISA/210) of PCT/JP2016/057053," dated Jun. 7, 2016, with English translation thereof, pp. 1-5.
(Continued)

*Primary Examiner* — Koosha Sharifi-Tafreshi
(74) *Attorney, Agent, or Firm* — JCIPRNET

(57) ABSTRACT

Provided are a projection type display device and a projection control method capable of presenting suitable information to an operator both during traveling on a public road and during operation at a working site to perform assistance for the operator. A projection type display device that is mounted in a construction machine 100 having a windshield 5 performs a control so that image light is projected onto each of a first projection range 5A, a second projection range 5B, and a third projection range 5C of the windshield 5 in a case where it is determined that the location of the construction machine 100 is a working site, and performs a control so that image light is projected onto only the third projection range 5C of the windshield 5 in a case where it is determined that the location of the construction machine 100 is a public road.

20 Claims, 8 Drawing Sheets

(51) Int. Cl.
*B60K 37/02* (2006.01)
*G02B 27/01* (2006.01)
*G06T 11/60* (2006.01)
*G09G 3/00* (2006.01)

(52) U.S. Cl.
CPC .... *G02B 27/0101* (2013.01); *B60K 2370/155* (2019.05); *B60K 2370/1529* (2019.05); *B60K 2370/1868* (2019.05); *B60K 2370/31* (2019.05); *B60K 2370/334* (2019.05); *B60K 2370/61* (2019.05); *B60Y 2200/41* (2013.01); *G02B 2027/014* (2013.01); *G02B 2027/0141* (2013.01); *G06T 11/60* (2013.01); *G09G 3/001* (2013.01); *G09G 2380/10* (2013.01)

(58) Field of Classification Search
CPC ...... B60K 2350/2065; B60K 2350/962; G09G 2380/10; G09G 3/003; G03B 21/00; G06K 9/00805; G06K 9/00671; G06K 9/00791; G06K 9/00798; G06K 9/00812; B60R 2300/205; B60R 1/00; G02B 27/0101; G02B 27/01; G02B 2027/014; G02B 2027/0141; G02B 27/0149; G02B 2027/0138; G06T 19/006
See application file for complete search history.

(56) References Cited

U.S. PATENT DOCUMENTS

| | | | |
|---|---|---|---|
| 2016/0193920 | A1 | 7/2016 | Tsubone et al. |
| 2016/0349066 | A1* | 12/2016 | Chung .............. G01C 21/3415 |

FOREIGN PATENT DOCUMENTS

| | | |
|---|---|---|
| JP | 2000247572 | 9/2000 |
| JP | 2009173195 | 8/2009 |
| JP | 2009184406 | 8/2009 |
| JP | 2009184542 | 8/2009 |
| JP | 2011001775 | 1/2011 |
| JP | 2014129676 | 7/2014 |
| JP | 2015054628 | 3/2015 |
| JP | 2015087512 | 5/2015 |
| JP | 2015099186 | 5/2015 |
| JP | 2015134521 | 7/2015 |
| WO | 2012164704 | 12/2012 |
| WO | 2014103498 | 7/2014 |

OTHER PUBLICATIONS

"Written Opinion of the International Searching Authority (Form PCT/ISA/237) of PCT/JP2016/057053," dated Jun. 7, 2016, with English translation thereof, pp. 1-9.

"Office Action of Japanese Counterpart Application," dated Nov. 7, 2017, with English translation thereof, pp. 1-7.

* cited by examiner

PROJECTION TYPE DISPLAY DEVICE AND PROJECTION CONTROL METHOD

CROSS-REFERENCE TO RELATED APPLICATIONS

This application is a Continuation of PCT International Application No. PCT/JP2016/057053 filed on Mar. 8, 2016, which claims priority under 35 U.S.C. § 119(a) to Japanese Patent Application No. 2015-178658 filed on Sep. 10, 2015. Each of the above application(s) is hereby expressly incorporated by reference, in its entirety, into the present application.

BACKGROUND OF THE INVENTION

1. Field of the Invention

The present invention relates to a projection type display device and a projection control method.

2. Description of the Related Art

A vehicle head-up display (HUD) that projects, using a windshield of a vehicle such as an automobile or a combiner disposed in the vicinity of the windshield as a screen, light to the screen to display an image is known. According to the HUD, a user can set an image based on the light projected from the HUD as a real image on the screen, or can set the image as a virtual image in front of the screen, so that a driver can visually recognize the image.

JP2009-184542A discloses a machine that is provided with an HUD, as a construction machine that belongs to a variety of machinery used for construction and civil engineering work, such as a shovel loader or a crane.

JP2009-173195A discloses a construction machine in which a monitor that displays a variety of images is mounted and switching is performed between images to be displayed on the monitor during traveling on a public road and during traveling on a construction site.

SUMMARY OF THE INVENTION

In a construction machine, movement of a line of sight of an operator is frequently performed, particularly, in a longitudinal direction, differently from a vehicle of which main purpose is transportation, such as an automobile. Further, a movement range of the line of sight of the operator in the longitudinal direction is wide differently from the vehicle of which main purpose is transportation. In addition, in the construction machine, the line of sight of the operator moves in accordance with movement of a power shovel and/or a bucket that is an operation target. In consideration of these points, in a construction machine with a windshield in front of an operator's seat, it is preferable that a virtual image and a real image can be visually recognized over a wide range of the windshield.

There is a construction machine capable of traveling on a public road other than a construction site, in addition to the construction site. A vehicle capable of traveling on a public road has a restriction in a projection range of image light in a case where an image is displayed using a windshield. In this way, between a public road and a construction site, conditions required for an HUD are different from each other.

The construction machine disclosed in JP2009-173195A changes content to be displayed on the monitor between the public road and the construction site, in which the above-mentioned specific problems of the HUD do not occur.

JP2009-184542A discloses a construction machine in which the HUD capable of switching a projection range of image light is mounted, but does not consider a case where the construction machine travels on a public road. Hereinbefore, the problems in a case where the HUD is mounted in the construction machine have been mainly described, but the same problems occur in an agricultural machine such as a farming machine such as a tractor or other working machines.

The invention has been made in consideration of the above-mentioned problems, and an object of the invention is to provide a projection type display device and a projection control method capable of presenting suitable information to an operator both during traveling on a public road and during operation at a working site to perform assistance for the operator.

According to an aspect of the invention, there is provided a projection type display device that is mounted in a working machine having a windshield, comprising: a projection unit that projects image light; a location detection unit that detects which one of a public road and a working site the working machine is located at; and a control unit that selectively performs any one of a first control for causing the projection unit to project image light using a first range of the windshield as a target and a second control for causing the projection unit to project image light using a projection surface of a second range smaller than the first range as a target, on the basis of the location of the working machine detected by the location detection unit, in which the control unit performs the first control in a case where the location of the working machine detected by the location detection unit is the working site, and performs the second control in a case where the location is the public road.

According to another aspect of the invention, there is provided a projection control method comprising: a location detection step of detecting which one of a public road and a working site a working machine having a windshield is located at; and a control step of selectively performing any one of a first control for causing a projection unit to project image light using a first range of the windshield as a target and a second control for causing the projection unit to project image light using a projection surface of a second range smaller than the first range as a target, on the basis of the location of the working machine detected in the location detection step, in which in the control step, the first control is performed in a case where the location of the working machine detected in the location detection step is the working site, and the second control is performed in a case where the location is the public road.

According to the invention, it is possible to provide a projection type display device and a projection control method capable of presenting suitable information to an operator both during traveling on a public road and during operation at a working site to perform assistance for the operator.

DESCRIPTION OF THE PREFERRED EMBODIMENTS

Hereinafter, embodiments of the invention will be described with reference to the accompanying drawings.

Figure 1:
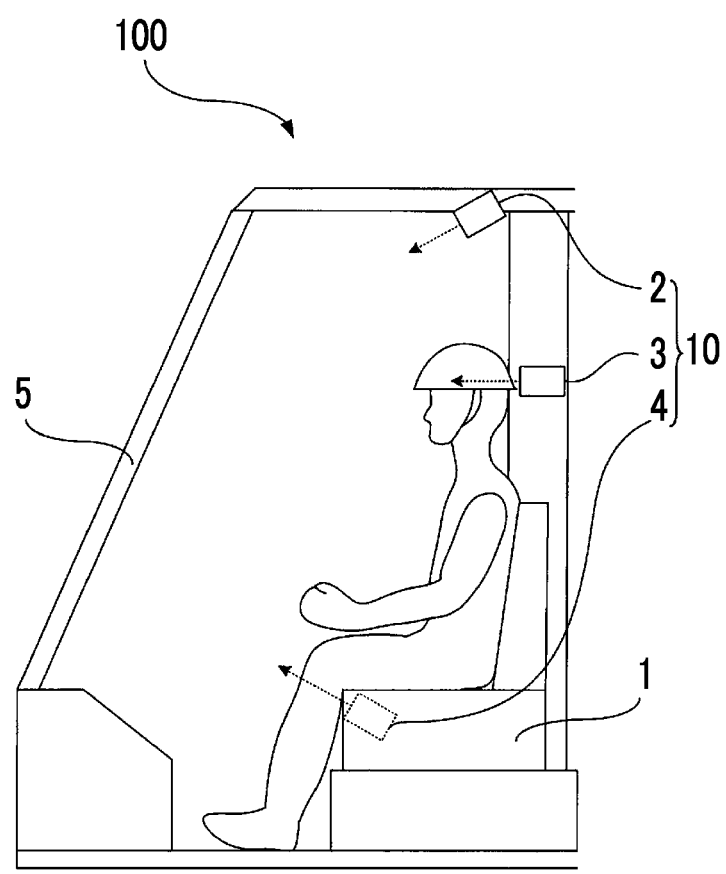
FIG. 1 is a schematic diagram showing a schematic configuration of a construction machine 100 provided with an HUD 10 that is an embodiment of a projection type display device of the invention.

FIG. 1 is a schematic diagram showing a schematic configuration of a construction machine 100 provided with an HUD 10 that is an embodiment of a projection type display device of the invention.

The HUD 10 shown in FIG. 1 is mounted in the construction machine 100 capable of traveling on a public road. And the HUD 10 may be mounted in an agricultural machine capable of traveling on a public road, instead of the construction machine. That is, the HUD 10 shown in FIG. 1 is mounted in a working machine capable of traveling on a public road including a working machine such as a construction machine or an agricultural machine.

The HUD 10 shown in FIG. 1 includes a unit 2 that is provided in an operator's cab above an operator in a state where the operator sits on an operator's seat 1 of the construction machine 100, a unit 3 that is provided in an operator's cab at the back of the operator, and a unit 4 that is provided under a seat surface of the operator's seat 1.

The units 2 to 4 are provided to be spaced from each other in a gravity direction (a longitudinal direction in FIG. 1) in the operator's cab of the construction machine 100. Each unit projects image light under the condition that a virtual image can be visually recognized in front of a windshield 5 of the construction machine 100. Here, the condition that the virtual image can be visually recognized in front of the windshield refers to a condition that the virtual image is formed in front of a visual field of the windshield.

The operator of the construction machine 100 can visually recognize information on a picture, characters, or the like for assisting an operation of the construction machine 100 by viewing image light that is projected onto the windshield 5 and is reflected therefrom. Further, the windshield 5 has a function of reflecting image light projected from the units 2 to 4 and simultaneously transmitting light from the outside (an outside world). Thus, the operator can visually recognize a virtual image based on the image light projected from the units 2 to 4 in a state where the virtual image is superimposed on a scene of the outside world.

In the HUD 10, since the units 2 to 4 are provided to be spaced from each other in the gravity direction in the operator's cab of the construction machine 100, it is possible to present a virtual image to the operator over a wide range of the windshield 5.

Figure 2:
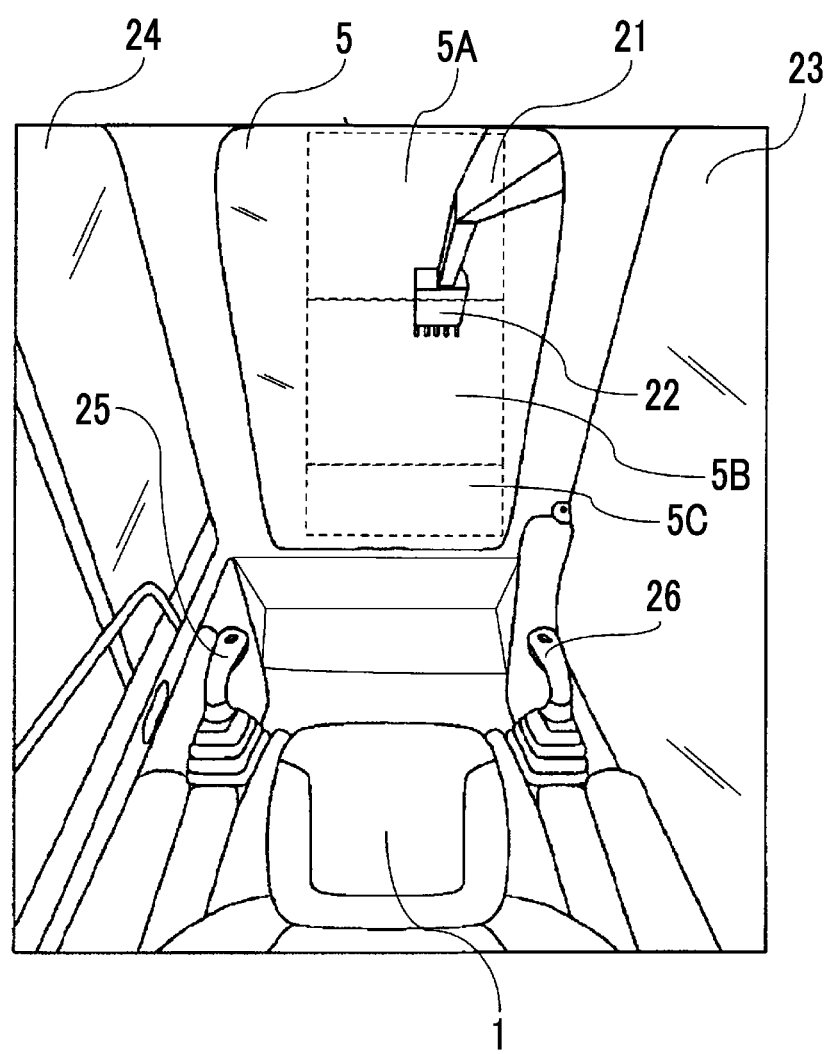
FIG. 2 is a diagram showing a configuration example in an operator's cab in the construction machine 100 shown in FIG. 1.

FIG. 2 is a diagram showing a configuration example in the operator's cab in the construction machine 100 shown in FIG. 1. FIG. 2 shows a front view in a state where the windshield 5 is seen from the operator's seat 1.

The construction machine 100 is a hydraulic shovel that includes an arm 21 and a bucket 22 in a front center of the machine.

The operator's cab is surrounded by transparent windows such as a windshield 5 that is a front window, a right window 23, a left window 24, and the like, and includes at least a left operating lever 25 for operating bending and stretching of the arm 21, a right operating lever 26 for operating digging and opening of the bucket 22, and the like around the operator's seat 1.

Three projection ranges of a first projection range 5A, a second projection range 5B, and a third projection range 5C are sequentially allocated onto the windshield 5, and the projection ranges are arranged in the gravity direction (longitudinal direction). Here, the number of projection ranges allocated onto the windshield 5 is 3, but it is sufficient if a plurality of projection ranges is allocated.

The first projection range 5A is a region where image light projected from the unit 2 is projected, which reflects the image light and simultaneously transmits light from the outside (outside world). The second projection range 5B is a region where image light projected from the unit 3 is projected, which reflects the image light and simultaneously transmits light from the outside (outside world). The third projection range 5C is a region where image light projected from the unit 4 is projected, which reflects the image light and simultaneously transmits light from the outside (outside world).

Since the construction machine 100 is capable of traveling on a public road, although not shown, a steering wheel, an accelerator, a brake, and the like for traveling, which are operated when traveling on the public road are provided. As the construction machine capable of traveling on the public road, for example, a dump car may be used.

Figure 3:
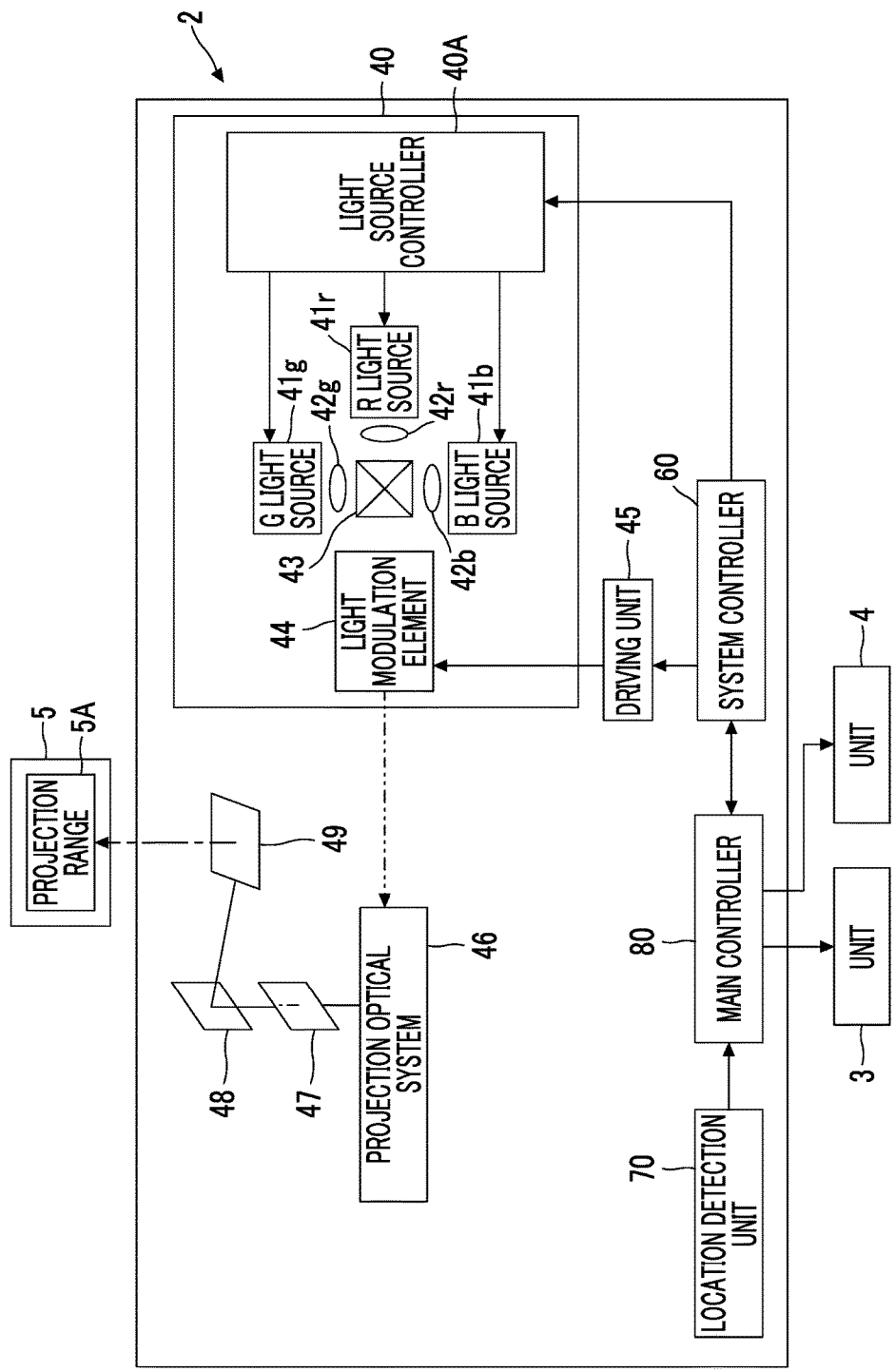
FIG. 3 is a schematic diagram showing an internal configuration of a unit 2 that forms the HUD 10 shown in FIG. 1.

FIG. 3 is a schematic diagram showing an internal configuration of the unit 2 that forms the HUD 10 shown in FIG. 1.

The unit 2 includes a light source unit 40, a driving unit 45, a projection optical system 46, a diffuser plate 47, a reflecting mirror 48, a magnifying glass 49, a system controller 60 that controls the light source unit 40 and the driving unit 45, a location detection unit 70, and a main controller 80.

The light source unit 40 includes a light source controller 40A, an R light source 41r that is a red light source that emits red light, a G light source 41g that is a green light source that emits green light, a B light source 41b that is a blue light source that emits blue light, a dichroic prism 43, a collimator lens 42r that is provided between the R light source 41r and the dichroic prism 43, a collimator lens 42g that is provided between the G light source 41g and the dichroic prism 43, a collimator lens 42b that is provided between the B light source 41b and the dichroic prism 43, and a light modulation element 44.

The dichroic prism 43 is an optical member for guiding light emitted from each of the R light source 41r, the G light source 41g, and the B light source 41b to the same optical path. That is, the dichroic prism 43 transmits red light that is collimated by the collimator lens 42r to be emitted to the light modulation element 44. Further, the dichroic prism 43 reflects green light that is collimated by the collimator lens 42g to be emitted to the light modulation element 44. Further, the dichroic prism 43 reflects blue light that is collimated by the collimator lens 42b to be emitted to the light modulation element 44. An optical member having such a function is not limited to a dichroic prism. For example, a cross dichroic mirror may be used.

The R light source 41r, the G light source 41g, and the B light source 41b respectively employ a light emitting element such as laser or a light emitting diode (LED). In this embodiment, an example in which the light sources of the light source unit 40 include three light sources of the R light source 41r, the G light source 41g, and the B light source 41b is shown, but the number of light sources may be 1, 2, 4 or more.

The light source controller 40A sets the amounts of luminescence of the R light source 41r, the G light source 41g, and the B light source 41b into predetermined luminescence amount patterns, and performs a control for sequentially emitting light from the R light source 41r, the G light source 41g, and the B light source 41b according to the luminescence amount patterns.

The light modulation element 44 modulates light emitted from the dichroic prism 43, and emits light (red color image light, blue color image light, and green color image light) based on projection image data that is image information to the projection optical system 46.

The light modulation element 44 may employ, for example, a liquid crystal on silicon (LCOS), a digital micromirror device (DMD), a micro electro mechanical systems (MEMS) element, a liquid crystal display device, or the like.

The driving unit 45 drives the light modulation element 44 according to projection image data input from the system controller 60, so that light (red color image light, blue color image light, and green color image light) based on the projection image data is emitted to the projection optical system 46.

The projection optical system 46 is an optical system for projecting visible light emitted from the light modulation element 44 of the light source unit 40 onto the diffuser plate 47. The optical system is not limited to a lens, and may employ a scanner.

The reflecting mirror 48 reflects light diffused by the diffuser plate 47 toward the magnifying glass 49.

The magnifying glass 49 magnifies an image based on light reflected by the reflecting mirror 48, and projects the magnified image onto the first projection range 5A of the windshield 5.

The location detection unit 70 detects which one of a public road and a working site the construction machine 100 is located at, and outputs information indicating the detected location of the construction machine 100 to the main controller 80.

As a method for detecting the location of the construction machine 100, for example, a first detecting method to a third detecting method to be described below may be used, but the invention is not limited to these methods.

In the first detecting method, for example, a global positioning system (GPS) receiver is mounted in the construction machine 100. The first detecting method is a method for detecting that the location of the construction machine 100 is a working site in a case where it is determined that current position information of the construction machine 100 received by the GPS receiver and working site information (information indicating a place where construction work is performed) that is registered in advance approximately match each other, and detecting that the location of the construction machine 100 is a public road in a case where it is determined that the GPS information and the working site information do not match each other.

In the second detecting method, for example, a short-range wireless communication unit is mounted in the construction machine 100, and a transmission unit that transmits radio waves is provided in an entrance gate of a working site. The method is a method for detecting that the location of the construction machine 100 is the working site in a case where the radio waves transmitted from the transmission unit of the entrance gate are received by the short-range wireless communication unit, when the construction machine 100 passes through the entrance gate.

In the third detecting method, for example, an operator inputs information indicating which one of a public road and a working site the construction machine 100 is located at by a manual operation, and the location of the construction machine 100 is detected on the basis of the input signal. The detection method based on the manual operation may be realized at low cost.

In a case where an image light projection command is received from the main controller 80, the system controller 60 projects image light based on projection image data onto the first projection range 5A, and in a case where an image light projection stop command is received, the system controller 60 controls the light source unit 40 so that the light source unit 40 enters a stop or standby state, and stops the projection of the image light onto the first projection range 5A.

The main controller 80 generally controls the entirety of the HUD 10, and is capable of communicating with each of the units 3 and 4. The main controller 80 forms a control unit of the HUD 10. A detailed function of the main controller 80 will be described later.

Figure 4:
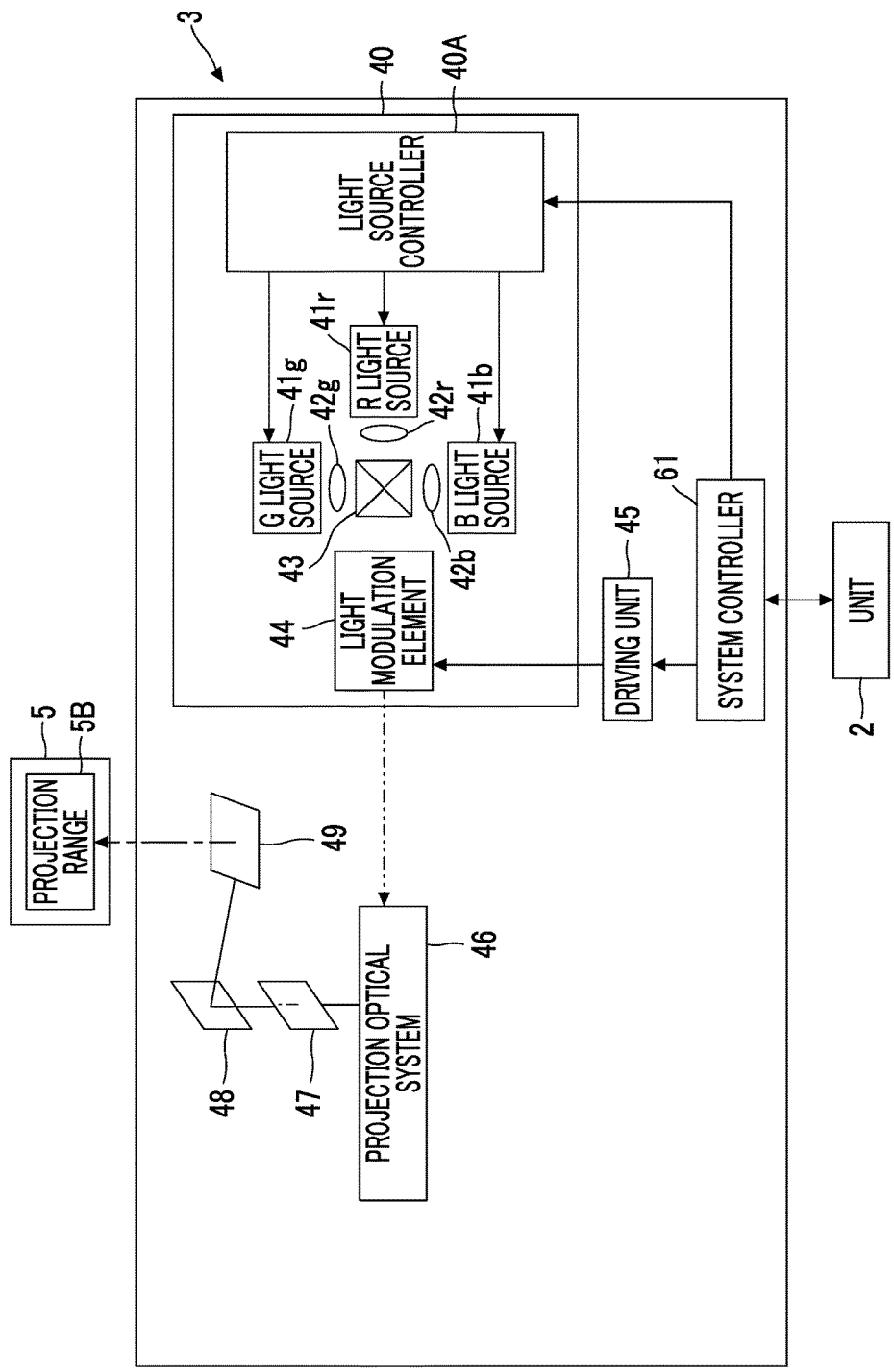
FIG. 4 is a schematic diagram showing an internal configuration of a unit 3 that forms the HUD 10 shown in FIG. 1.

FIG. 4 is a schematic diagram showing an internal configuration of the unit 3 that forms the HUD 10 shown in FIG. 1. In FIG. 4, the same components as in FIG. 3 are given the same reference numerals.

The unit 3 has a configuration in which the location detection unit 70 and the main controller 80 in the unit 2 shown in FIG. 3 are removed and the system controller 60 is changed into a system controller 61.

The system controller 61 of the unit 3 controls the driving unit 45 and the light source controller 40A in the unit 3, so that image light based on projection image data is projected onto the second projection range 5B.

The system controller 61 is able to communicate with the main controller 80 of the unit 2, and projects image light based on projection image data onto the second projection range 5B in a case where an image light projection command is received from the main controller 80. In a case where an image light projection stop command is received from the main controller 80, the system controller 61 controls the light source unit 40 so that the light source unit 40 enters a stop or standby state, and stops the projection of the image light onto the second projection range 5B.

Figure 5:
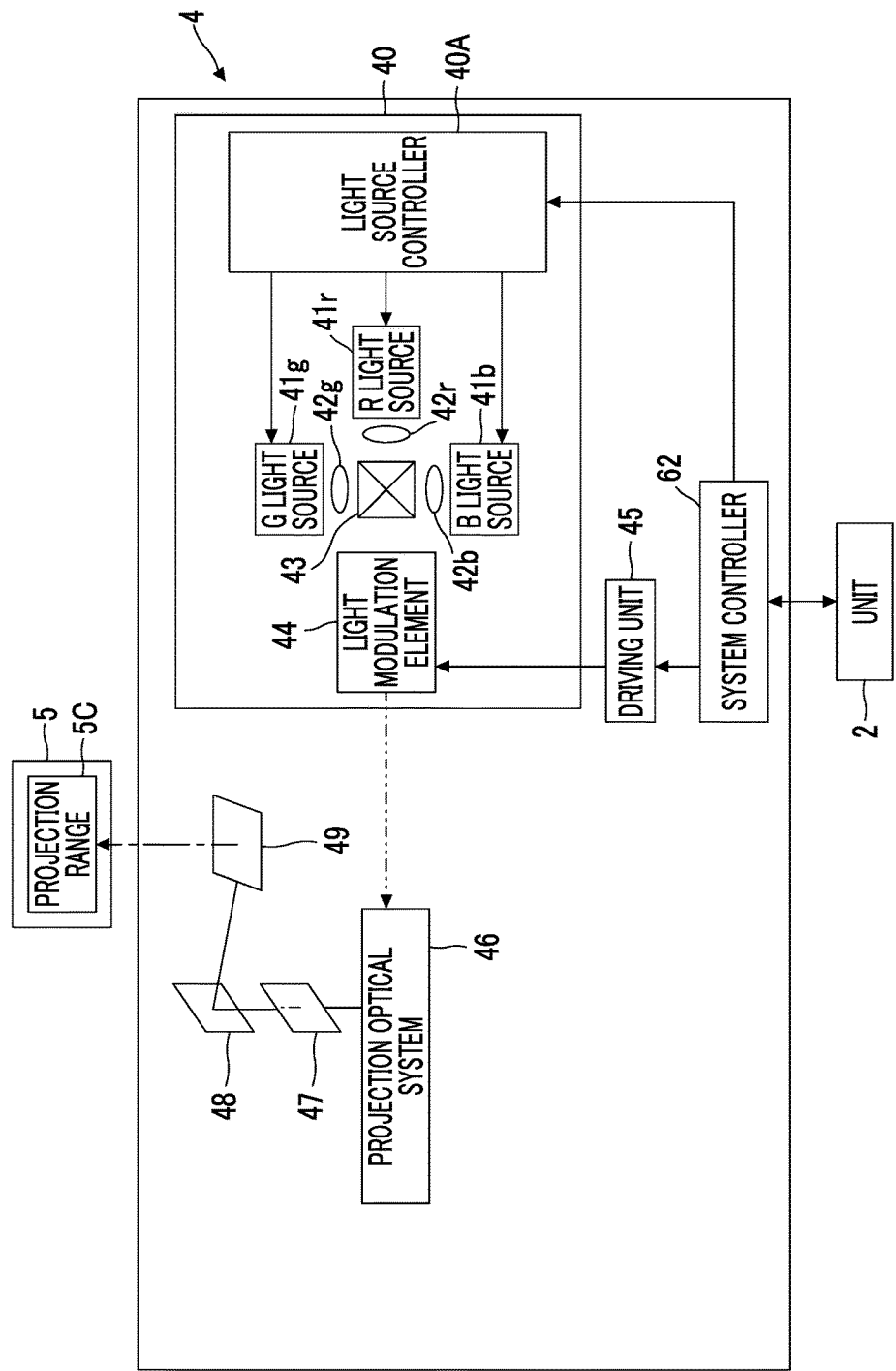
FIG. 5 is a schematic diagram showing an internal configuration of a unit 4 that forms the HUD shown in FIG. 1.

FIG. 5 is a schematic diagram showing an internal configuration of the unit 4 that forms the HUD 10 shown in FIG. 1. In FIG. 5, the same components as in FIG. 3 are given the same reference numerals.

The unit 4 has a configuration in which the location detection unit 70 and the main controller 80 in the unit 2 shown in FIG. 3 are removed, and the system controller 60 is changed into a system controller 62.

The system controller 62 of the unit 4 controls the driving unit 45 and the light source controller 40A in the unit 4, so that an image light based on projection image data is projected onto the third projection range 5C.

The system controller 62 is able to communicate with the main controller 80 of the unit 2, and projects image light based on projection image data onto the third projection range 5C in a case where an image light projection command is received from the main controller 80. In a case where an image light projection stop command is received from the main controller 80, the system controller 62 controls the light source unit 40 so that the light source unit 40 enters a stop or standby state, and stops the projection of the image light onto the third projection range 5C.

The light source unit 40, the projection optical system 46, the diffuser plate 47, the reflecting mirror 48, and the magnifying glass 49 in the unit 2 form a projection unit that projects image light based on projection image data onto the first projection range 5A.

The light source unit 40, in the unit 3, the projection optical system 46, the diffuser plate 47, the reflecting mirror 48, and the magnifying glass 49 form a projection unit that projects image light based on the projection image data onto the second projection range 5B.

The light source unit 40, the projection optical system 46, the diffuser plate 47, the reflecting mirror 48, and the magnifying glass 49 in the unit 4 form a projection unit that projects image light based on the projection image data onto the third projection range 5C.

The three projection units form a projection unit of the HUD 10.

Returning to FIG. 3, the main controller 80 selectively performs any one of a first control for causing the three projection units to project image light by using a first range of the windshield 5 as a target and a second control for causing a part of the three projection units to project image light by using a projection surface of a second range smaller than the first range as a target, on the basis of the location of the construction machine 100 detected by the location detection unit 70. In the HUD 10, the second range is set as a range set on the windshield 5 that is a projection surface.

Specifically, the main controller 80 performs the first control in a case where it is detected that the location of the construction machine 100 is a working site, and performs the second control in a case where it is detected that the location of the construction machine 100 is a public road.

In this embodiment, the main controller 80 performs a control for causing the units 2 to 4 to respectively project image light onto the first projection range 5A, the second projection range 5B, and the third projection range 5C of the windshield 5 from the units 2 to 4, as the first control. In the first control, a range obtained by combining the first projection range 5A, the second projection range 5B, and the third projection range becomes the first range.

Further, the main controller 80 performs a control for causing the units 2 and 3 to stop the projection of the image light onto the first projection range 5A and the second projection range 5B of the windshield 5 and causing only the unit 4 to project image light onto the third projection range 5C of the windshield 5, as the second control. In the second control, the third projection range 5C becomes the second range.

Figure 6:
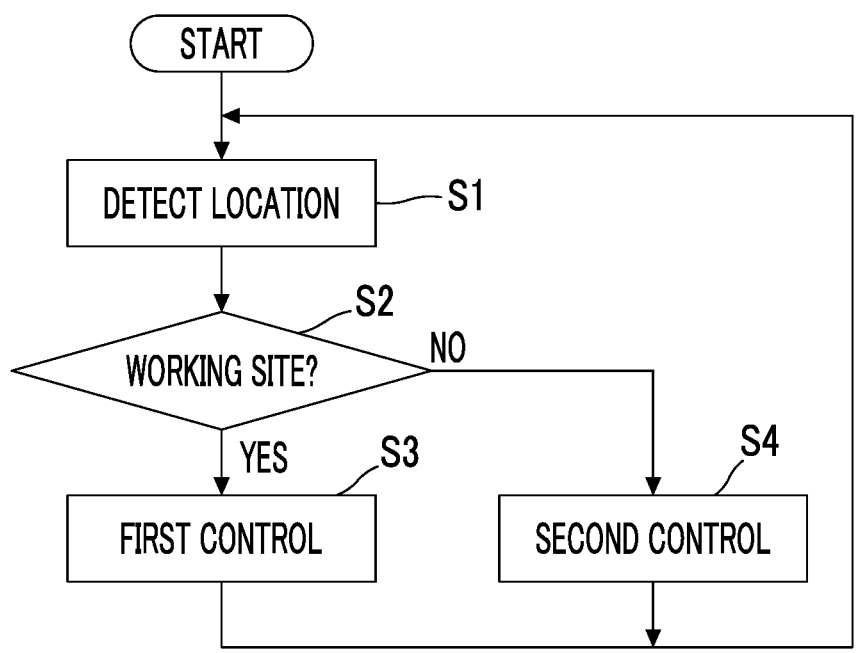
FIG. 6 is a flowchart for illustrating an operation of the HUD 10 shown in FIG. 1.

FIG. 6 is a flowchart for illustrating an operation of the HUD 10 shown in FIG. 1.

In a case where the HUD 10 is started, the location detection unit 70 of the unit 2 detects the location of the construction machine 100 (step S1).

The main controller 80 of the unit 2 determines which one of a public road and a working site the construction machine 100 is located at, on the basis of the detection result of the location detection unit 70 (step S2). The main controller 80 performs the first control in a case where it is determined that the location of the construction machine 100 is the working site (YES in step S2) (step S3).

Through the first control, image light based on projection image data is projected onto the first projection range 5A, the second projection range 5B, and the third projection range 5C of the windshield 5. The projection image data corresponds to data for displaying a traveling speed of a construction machine, a warning, navigation information, construction information, or the like, for example.

On the other hand, the main controller 80 of the unit 2 performs the second control in a case where it is determined that the construction machine 100 is not located at the working site, that is, the construction machine 100 is located at the public road (NO in step S2) (step S4). Through the second control, image light is projected onto only the third projection range 5C of the windshield 5.

After the process of step S3 or S4, the procedure returns to step S1, the above-described processes are repeated.

As described above, according to the HUD 10 shown in FIG. 1, during operation at the working site, it is possible to project image light onto a wide range of the windshield 5 using the units 2 to 4 that are provided in the gravity direction. Thus, even in a case where movement of a line of sight of an operator in a longitudinal direction becomes large according to movement of a shovel, a bucket, or the like that is an operation target, it is possible to perform sufficient working assistance to the operator.

Further, according to the HUD 10 shown in FIG. 1, in a case where the construction machine 100 travels on a public road, a projection range of image light onto the windshield 5 becomes narrow compared with a working site. Particularly, in the HUD 10, image light is projected onto only the third projection range 5C that is disposed at a position closest to the ground in the gravity direction. Thus, when the construction machine 100 travels on a public road where a projection range of image light is restricted, it is possible to enhance safety.

In the above description, an example in which in a case where the location of the construction machine 100 is a working site, image light is projected onto each of the first projection range 5A, the second projection range 5B, and the third projection range 5C is shown. However, it is not essential that the image light is constantly projected onto the respective projection ranges. For example, a sight line detection unit that detects a line of sight of an operator may be provided in the HUD 10. Further, the main controller 80 may perform a control for projecting image light onto only a projection range that the line of sight of the operator enters, in the first control.

Furthermore, in the above description, an example in which a plurality of projection ranges set on the windshield 5 are arranged without a gap in the gravity direction (longitudinal direction) is shown, but the plurality of projection ranges set on the windshield 5 may be disposed without a gap in the horizontal direction (transverse direction). In this case, a configuration in which projection units that projects image light onto respective projection ranges are disposed to be spaced from each other in the horizontal direction in the operator's cab of the construction machine 100 may be used.

In this configuration, in a case where the location of the construction machine 100 is a working site, the main controller 80 performs a control for causing the plurality of projection units to be able to project image light. Further, in a case where the location of the construction machine 100 is a public road, the main controller 80 may perform a control for causing only a part of the plurality of projection units (for example, a projection unit that projects image light onto a projection range disposed at one edge portion, among the plurality of projection ranges) to be able to project image light.

With such a configuration, it is possible to present information on working assistance over a wide range in the horizontal direction at a working site. Further, during traveling on a public road, it is possible to perform driving assistance while enhancing safety by sufficiently securing a visual field in front of an operator's seat.

Further, in the above description, an example in which a plurality of projection ranges set on the windshield 5 is disposed in one direction is shown, but the plurality of projection ranges may be set to be disposed in two dimensions.

In the HUD 10 shown in FIG. 1, a configuration in which the units 3 and 4 are removed and a projection unit that can change the size of a projection range of image light by a projection optical system is used as a projection unit included in the unit 2 may be used.

In the case of this configuration, the main controller 80 of the unit 2 sets a large projection range to perform projection of image light in a case where the location of the construction machine 100 is a working site, and sets a small projection range to perform projection of image light in a case where the location of the construction machine 100 is a public road. Thus, it is possible to perform projection of image light in a suitable range during traveling on a public road or at a working site.

In addition, in the above description, an example in which the location detection unit 70 and the main controller 80 are provided in the unit 2 is shown, but a configuration in which a control unit that includes the location detection unit 70 and the main controller 80 is provided as a separate body and the control unit generally controls the system controllers of the units 2 to 4 may be used.

Figure 7:
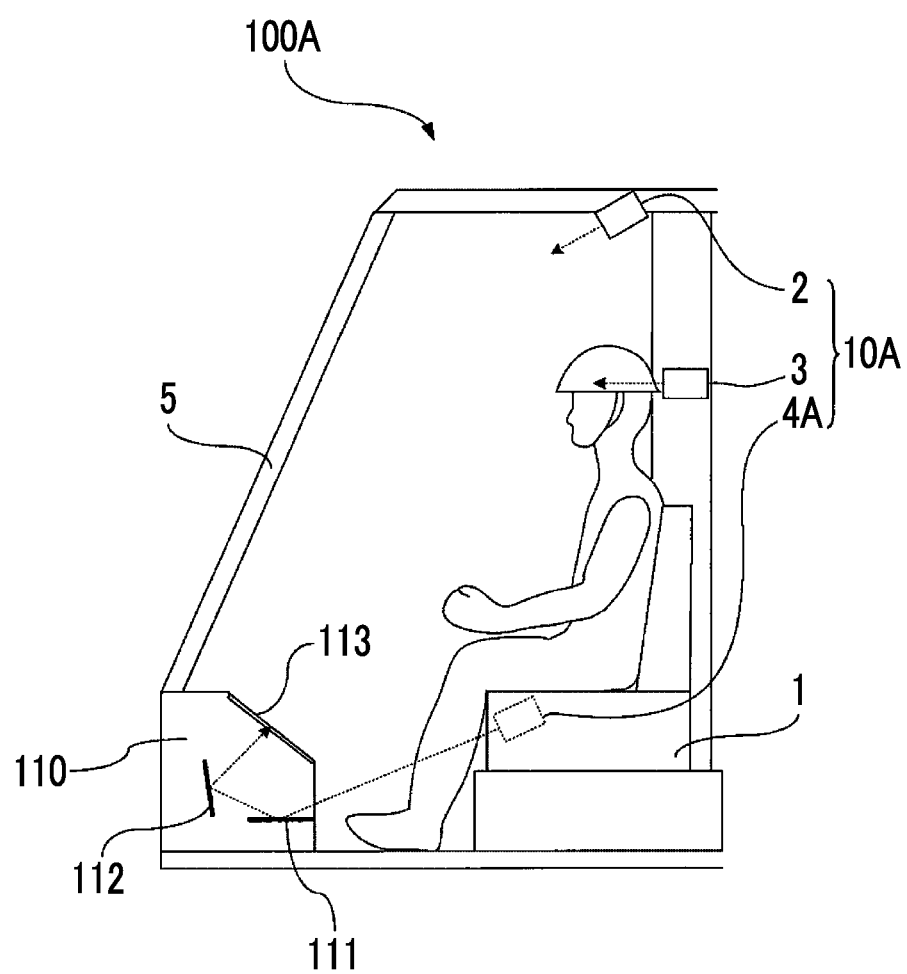
FIG. 7 is a schematic diagram showing a schematic configuration of a construction machine 100A that is a modification example of the construction machine 100 shown in FIG. 1.

FIG. 7 is a schematic diagram showing a schematic configuration of a construction machine 100A that is a modification example of the construction machine 100 shown in FIG. 1. In FIG. 7, the same the same components as in FIG. 1 are given the same reference numerals.

In the construction machine 100A shown in FIG. 7, in addition to the configuration of the construction machine 100, a reflecting mirror 111 and a reflecting mirror 112 are provided inside a dash board 110, and a projection surface 113 is provided on an outer surface of the dash board 110.

An opening is provided in the dash board 110, and the opening is closed by a transparent member such as glass. Further, on a front surface of the transparent member, a film and/or a sheet member for displaying an image based on image light is attached. The transparent member, the film, and the sheet member form the projection surface 113. The area of the projection surface 113 is smaller than the area of the range obtained by combining the first projection range 5A, the second projection range 5B, and the third projection range 5C.

Further, an HUD 10A mounted in the construction machine 100A shown in FIG. 7 has a configuration in which the unit 4 in the HUD 10 is modified to a unit 4A.

Figure 8:
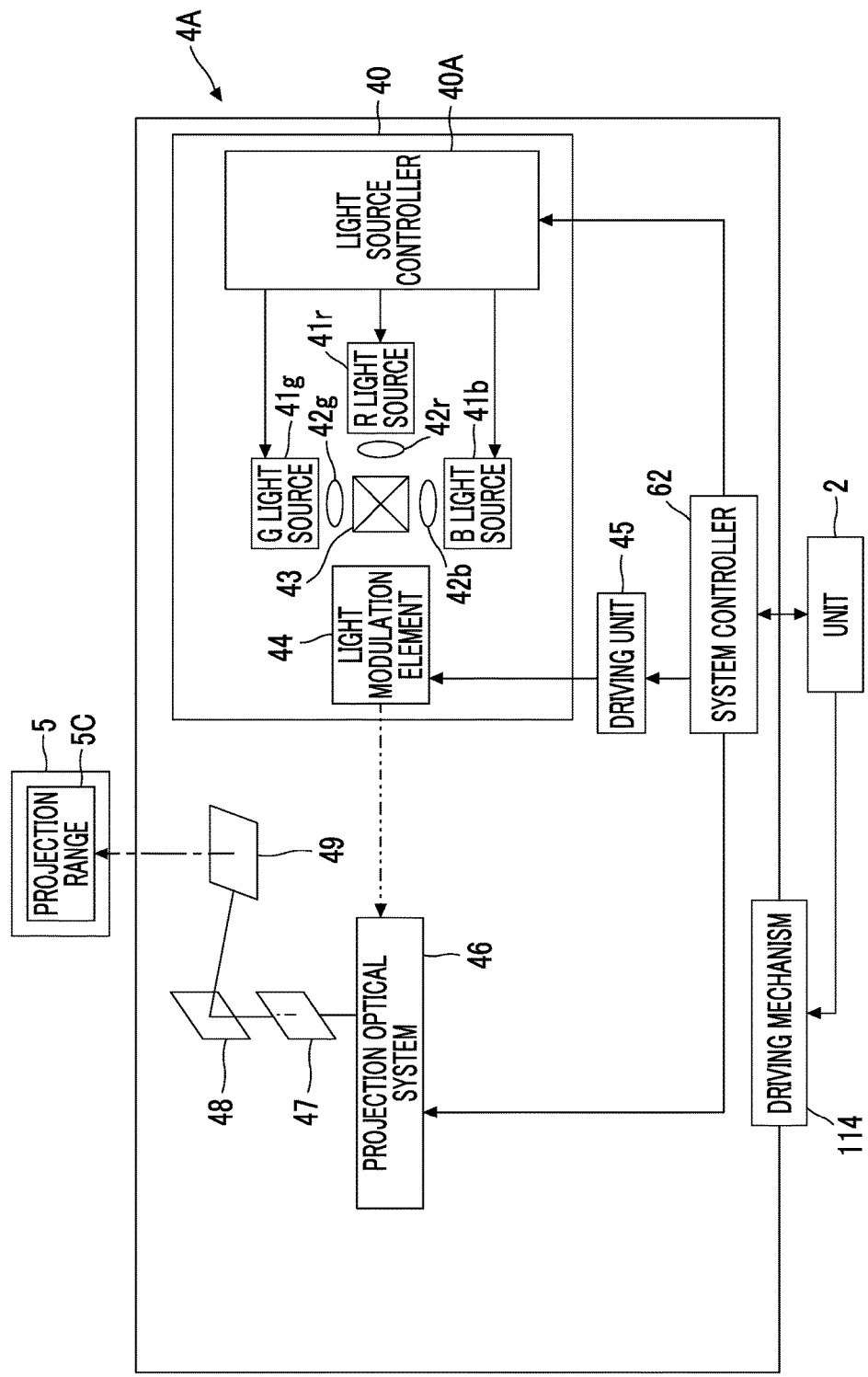
FIG. 8 is a schematic diagram showing an internal configuration of a unit 4A of an HUD 10A mounted in the construction machine 100A shown in FIG. 7.

FIG. 8 is a schematic diagram showing an internal configuration of the unit 4A of the HUD 10A mounted in the construction machine 100A shown in FIG. 7. In FIG. 8, the same the same components as in FIG. 5 are given the same reference numerals.

The unit 4A has a configuration in which a driving mechanism 114 is additionally provided in the unit 4. Further, the projection optical system 46, the diffuser plate 47, the reflecting mirror 48, and the magnifying glass 49 in the unit 4A are designed so that image light is projected onto the third projection range 5C under the condition that a real image can be visually recognized in the third projection range 5C.

The driving mechanism 114 is a mechanism that drives the unit 4A to change a projection direction of image light in the unit 4A. The driving mechanism 114 is configured to perform switching between a state where image light is projected onto the third projection range 5C from the unit 4A and a state where image light is projected onto the reflecting mirror 111 inside the dash board 110 from the unit 4A. The driving mechanism 114 drives the unit 4A on the basis of a command from the main controller 80 of the unit 2.

Further, a projection optical system 46 included in the unit 4A includes an optical path length changing mechanism (not shown) that changes an optical path length of image light. The optical path length changing mechanism is controlled by the system controller 62 in the unit 4A.

The system controller 62 controls the optical path length changing mechanism on the basis of a command from the main controller 80 of the unit 2, and performs switching between a state where an image based on image light projected from the unit 4A can be visually recognized as a real image in the third projection range 5C and a state where an image based on image light projected from the unit 4A can be visually recognized as a real image on the projection surface 113.

The system controller 62 changes an optical path length of the projection optical system 46 in consideration of an optical path length of image light that is projected from the unit 4A and reaches the projection surface 113 in a state where the unit 4A projects image light onto the reflecting mirror 111 inside the dash board 110.

In this way, the HUD 10A includes the units 2 and 3 for causing an operator to visually recognize a virtual image, and the unit 4A for causing the operator to visually recognize a real image.

In the HUD 10A, a projection unit included in the unit 2 and a projection unit included in the unit 3 form a first projection unit that projects image light under the condition that a virtual image can be visually recognized in front of the windshield 5. Further, in the HUD 10A, a projection unit included in the unit 4A forms a second projection unit that projects image light under the condition that a real image can be visually recognized on the windshield 5. Here, the condition that the real image can be visually recognized on the windshield refers to a condition that a real image is formed on the windshield.

Further, as described above, the second projection unit is configured to perform switching between a first mode in which image light is projected onto the third projection range 5C of the windshield 5 and a second mode in which image light is projected onto a projection surface 113 other than the windshield 5.

The main controller 80 of the unit 2 in the HUD 10A operates the second projection unit according to the first mode in a case where the first control for projecting image light using the first range of the windshield 5 as a target is performed. Further, the main controller 80 operates the second projection unit according to the second mode in a case where the second control for projecting image light using a projection surface of the second range narrower than the first range as a target is performed. In the HUD 10A, the projection surface of the second range is used as the projection surface 113.

An operation of the HUD 10A having such a configuration will be described. Since its basic operation is the same as in FIG. 6, description thereof will not be repeated.

In the HUD 10A, the main controller 80 controls the driving mechanism 114 of the unit 4A in a case where the second control is performed in step S4 of FIG. 6 to change a projection direction of image light in the unit 4A toward the reflecting mirror 111. Further, the main controller 80 performs a command for changing an optical path length of the image light into a value in which a real image is displayed on the projection surface 113, with respect to the system controller 62 of the unit 4A. The system controller 62 changes an optical path length of the projection optical system 46 according to the command.

Through the above-described processes, image light projected from the unit 4A is reflected from the reflecting mirror 111, is reflected from the reflecting mirror 112 again, and is formed as a real image on the third projection range 5C.

As described above, according to the HUD 10A, during working at the working site, it is possible to receive working assistance based on a virtual image and a real image in a wide range by image light that is projected onto the windshield 5 from the unit 2, the unit 3, and the unit 4A. On the other hand, during traveling on a public road, image light is not projected from the unit 2 and the unit 3, and image light is projected onto only the projection surface 113. Thus, it is possible to sufficiently secure a visual field in front of the windshield 5, and to enhance safety. Further, an operator can receive driving assistance during traveling on a public road using a real image displayed on the projection surface 113.

According to the HUD 10A, since image light is not projected onto the windshield 5 during traveling on a public road, it is possible to effectively secure a visual field. Thus, it is effective in a construction machine having a small width of a windshield in the gravity direction (for example, a dump car in which a laterally long windshield is mounted).

The unit 4A of the HUD 10A performs image projection so that a real image can be visually recognized. Thus, according to the unit 4A, it is possible to easily perform design for enlarging a projection range of image light, compared with the units 2 and 3. Accordingly, it is possible to simply realize enlargement of a display screen in the first control, compared with the HUD 10.

As described above, the following configurations are disclosed in this specification.

A disclosed projection type display device is mounted in a working machine having a windshield, and includes: a projection unit that projects image light; a location detection unit that detects which one of a public road and a working site the working machine is located at; and a control unit that selectively performs any one of a first control for causing the projection unit to project image light using a first range of the windshield as a target and a second control for causing the projection unit to project image light using a projection surface of a second range smaller than the first range as a target, on the basis of the location of the working machine detected by the location detection unit, in which the control unit performs the first control in a case where the location of the working machine detected by the location detection unit is the working site, and performs the second control in a case where the location is the public road.

The disclosed projection type display device is configured so that the projection unit includes a plurality of projection units having different ranges onto which image light is projected in the windshield, and the control unit causes the plurality of projection units to project image light in the first control, and causes a part of the plurality of projection units to project image light in the second control.

The disclosed projection type display device is configured so that the ranges onto which the image light is projected by the plurality of respective projection units are arranged in a gravity direction.

The disclosed projection type display device is configured so that the part of the plurality of projection units is a projection unit that projects image light onto a range at a position closest to the ground in the gravity direction among the ranges onto which the image light is projected by the plurality of respective projection units.

The disclosed projection type display device is configured so that the plurality of projection units includes a first projection unit that projects image light under a condition that a virtual image is visually recognizable in front of the windshield and a second projection unit that projects image light under a condition that a real image is visually recognizable on the windshield.

The disclosed projection type display device is configured so that the part of the plurality of projection units is the second projection unit.

The disclosed projection type display device is configured so that the second projection unit is configured to perform switching between a first mode in which image light is projected onto the windshield and a second mode in which image light is projected onto a projection surface other than the windshield, and the control unit operates the second projection unit according to the first mode in a case where the first control is performed, and operates the second projection unit according to the second mode in a case where the second control is performed.

The disclosed projection type display device is configured so that the location detection unit detects which one of the public road and the working site the working machine is located at, on the basis of information indicating the location of the working machine that is manually input.

A disclosed projection control method includes: a location detection step of detecting which one of a public road and a working site a working machine having a windshield is located at; and a control step of selectively performing any one of a first control for causing a projection unit to project image light using a first range of the windshield as a target and a second control for causing the projection unit to project image light using a projection surface of a second range smaller than the first range as a target, on the basis of the location of the working machine detected in the location detection step, in which in the control step, the first control is performed in a case where the location of the working machine detected in the location detection step is the working site, and the second control is performed in a case where the location is the public road.

The disclosed projection control method is configured so that the projection unit includes a plurality of projection units having different ranges onto which image light is projected in the windshield, and in the control step, the plurality of projection units projects image light in the first control, and a part of the plurality of projection units projects image light in the second control.

The disclosed projection control method is configured so that the ranges onto which the image light is projected by the plurality of respective projection units are arranged in a gravity direction.

The disclosed projection control method is configured so that the part of the plurality of projection units is a projection unit that projects image light onto a range at a position closest to the ground in the gravity direction among the ranges onto which the image light is projected by the plurality of respective projection units.

The disclosed projection control method is configured so that the plurality of projection units includes a first projection unit that projects image light under a condition that a virtual image is visually recognizable in front of the windshield and a second projection unit that projects image light under a condition that a real image is visually recognizable on the windshield.

The disclosed projection control method is configured so that the part of the plurality of projection units is the second projection unit.

The disclosed projection control method is configured so that the second projection unit is configured to perform switching between a first mode in which image light is projected onto the windshield and a second mode in which image light is projected onto a projection surface other than the windshield, and in the control step, the second projection unit is operated according to the first mode in a case where the first control is performed, and is operated according to the second mode in a case where the second control is performed.

The disclosed projection control method is configured so that in the location detection step, which one of the public road and the working site the working machine is located at is detected on the basis of information indicating the location of the working machine that is manually input.

The invention is applied to a working machine, such as a construction machine or an agricultural machine, which provides high comfort and effectiveness.

EXPLANATION OF REFERENCES 2, 3, 4: unit
5: windshield
10, 10A: HUD
40: light source unit
45: driving unit
60, 61, 62: system controller
70: location detection unit
80: main controller
100, 100A: construction machine

What is claimed is:

1. A projection type display device that is mounted in a working machine having a windshield, comprising:
   a projector that projects image light; and
   a controller that detects between a public road and a working site to determine a location of the working machine, and selectively performs any one of a first control for causing the projector to project image light using a first range of the windshield as a target and a second control for causing the projector to project image light using a projection surface of a second range smaller than the first range as a target on the basis of the location of the working machine detected,
   wherein the controller performs the first control in a case where the location of the working machine detected is the working site, and performs the second control in a case where the location is the public road,
   the projector includes a plurality of projectors having different ranges onto which image light is projected in the windshield,
   the controller causes the plurality of projectors to project image light in the first control, and causes a part of the plurality of projectors to project image light in the second control, and
   the plurality of projectors includes a first projector that projects image light under a condition that a virtual image is visually recognizable in front of the windshield and a second projector that projects image light under a condition that a real image is visually recognizable on the windshield.

2. The projection type display device according to claim 1,
   wherein the ranges onto which the image light is projected by the plurality of respective projectors are arranged in a gravity direction.

3. The projection type display device according to claim 2,
   wherein the part of the plurality of projectors is a projector that projects image light onto a range at a position closest to the ground in the gravity direction among the ranges onto which the image light is projected by the plurality of respective projectors.

4. The projection type display device according to claim 1,
   wherein the part of the plurality of projectors is the second projector.

5. The projection type display device according to claim 4,
   wherein the second projector is configured to perform switching between a first mode in which image light is projected onto the windshield and a second mode in which image light is projected onto a projection surface other than the windshield, and
   the controller operates the second projector according to the first mode in a case where the first control is performed, and operates the second projector according to the second mode in a case where the second control is performed.

6. The projection type display device according to claim 1,
   wherein the controller detects between the public road and the working site to determine the location of the working machine on the basis of information indicating the location of the working machine that is manually input.

7. The projection type display device according to claim 2,
   wherein the controller detects between the public road and the working site to determine the location of the working machine on the basis of information indicating the location of the working machine that is manually input.

8. The projection type display device according to claim 3,
   wherein the controller detects between the public road and the working site to determine the location of the working machine on the basis of information indicating the location of the working machine that is manually input.

9. The projection type display device according to claim 4,
   wherein the controller detects between the public road and the working site to determine the location of the working machine on the basis of information indicating the location of the working machine that is manually input.

10. The projection type display device according to claim 5,
    wherein the controller detects between the public road and the working site to determine the location of the working machine on the basis of information indicating the location of the working machine that is manually input.

11. A projection control method for the projection type display device comprising:
   detecting between a public road and a working site to determine a location of a working machine having a windshield; and
   selectively performing any one of a first control for causing a projector to project image light using a first range of the windshield as a target and a second control for causing the projector to project image light using a projection surface of a second range smaller than the first range as a target on the basis of the location of the working machine detected,
   wherein the first control is performed in a case where the location of the working machine detected is the working site, and the second control is performed in a case where the location is the public road,
   the projector includes a plurality of projectors having different ranges onto which image light is projected in the windshield, and
   wherein the plurality of projectors projects image light in the first control, and a part of the plurality of projectors projects image light in the second control, and
   the plurality of projectors includes a first projector that projects image light under a condition that a virtual image is visually recognizable in front of the windshield and a second projector that projects image light under a condition that a real image is visually recognizable on the windshield.

12. The projection control method according to claim 11, wherein the ranges onto which the image light is projected by the plurality of respective projectors are arranged in a gravity direction.

13. The projection control method according to claim 12, wherein the part of the plurality of projectors is a projector that projects image light onto a range at a position closest to the ground in the gravity direction among the ranges onto which the image light is projected by the plurality of respective projectors.

14. The projection control method according to claim 11, wherein the part of the plurality of projectors is the second projector.

15. The projection control method according to claim 14, wherein the second projector is configured to perform switching between a first mode in which image light is projected onto the windshield and a second mode in which image light is projected onto a projection surface other than the windshield, and
   wherein the second projector is operated according to the first mode in a case where the first control is performed, and is operated according to the second mode in a case where the second control is performed.

16. The projection control method according to claim 11, wherein in the step of detecting between the public road and the working site to determine the location of the working machine having the windshield, the location of the working machine is determined on the basis of information indicating the location of the working machine that is manually input.

17. The projection control method according to claim 12, wherein in the step of detecting between the public road and the working site to determine the location of the working machine having the windshield, the location of the working machine is determined on the basis of information indicating the location of the working machine that is manually input.

18. The projection control method according to claim 13, wherein in the step of detecting between the public road and the working site to determine the location of the working machine having the windshield, the location of the working machine is determined on the basis of information indicating the location of the working machine that is manually input.

19. The projection control method according to claim 14, wherein in the step of detecting between the public road and the working site to determine the location of the working machine having the windshield, the location of the working machine is determined on the basis of information indicating the location of the working machine that is manually input.

20. The projection control method according to claim 15, wherein in the step of detecting between the public road and the working site to determine the location of the working machine having the windshield, the location of the working machine is determined on the basis of information indicating the location of the working machine that is manually input.

* * * * *